Figure 1:
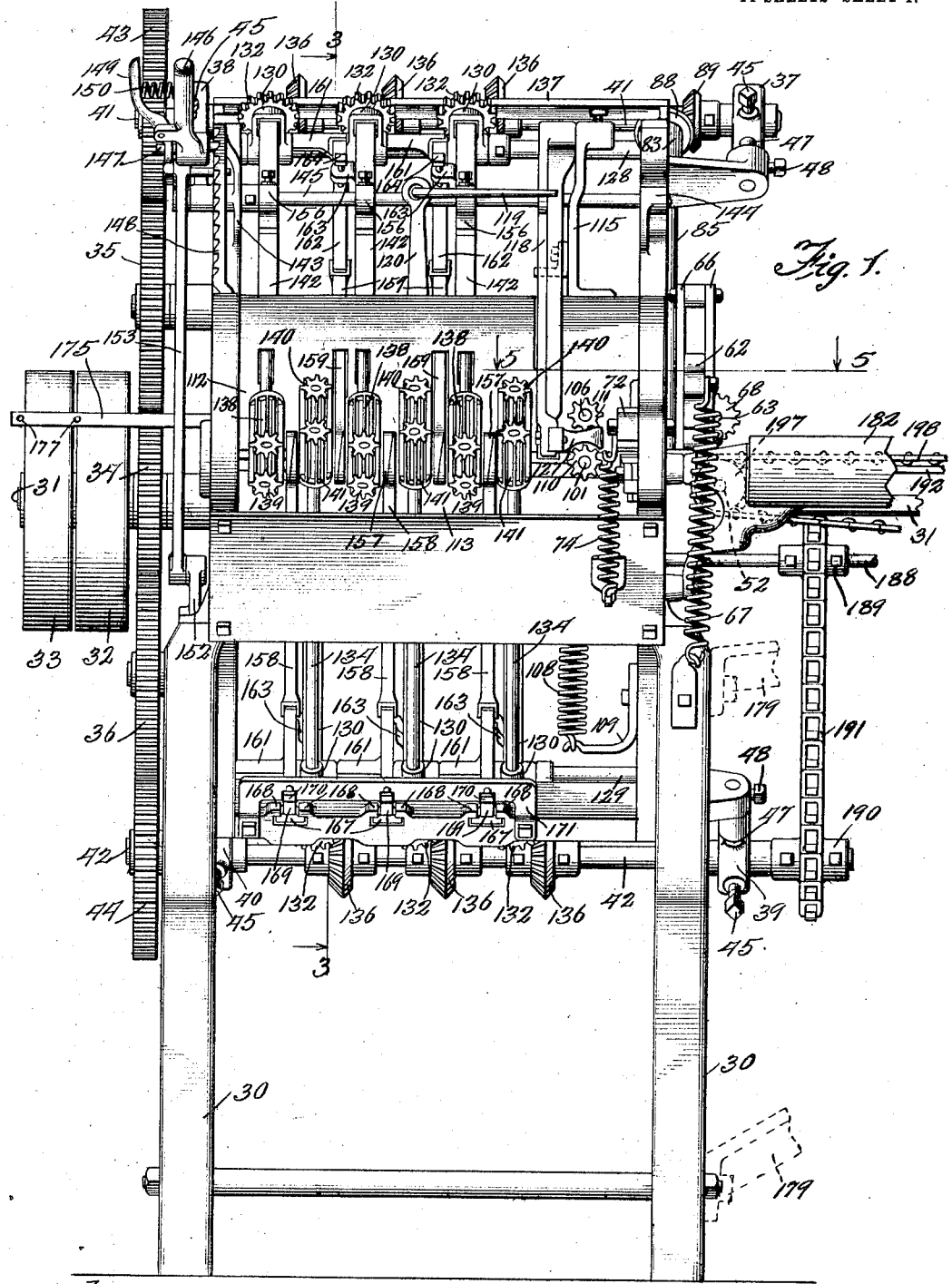

J. M. C. JONES.
GREEN CORN CUTTING MACHINE.
APPLICATION FILED FEB. 27, 1911.

1,037,014.

Patented Aug. 27, 1912.

14 SHEETS—SHEET 5.

J. M. C. JONES.
GREEN CORN CUTTING MACHINE.
APPLICATION FILED FEB. 27, 1911.
1,037,014.
Patented Aug. 27, 1912
14 SHEETS—SHEET 6.
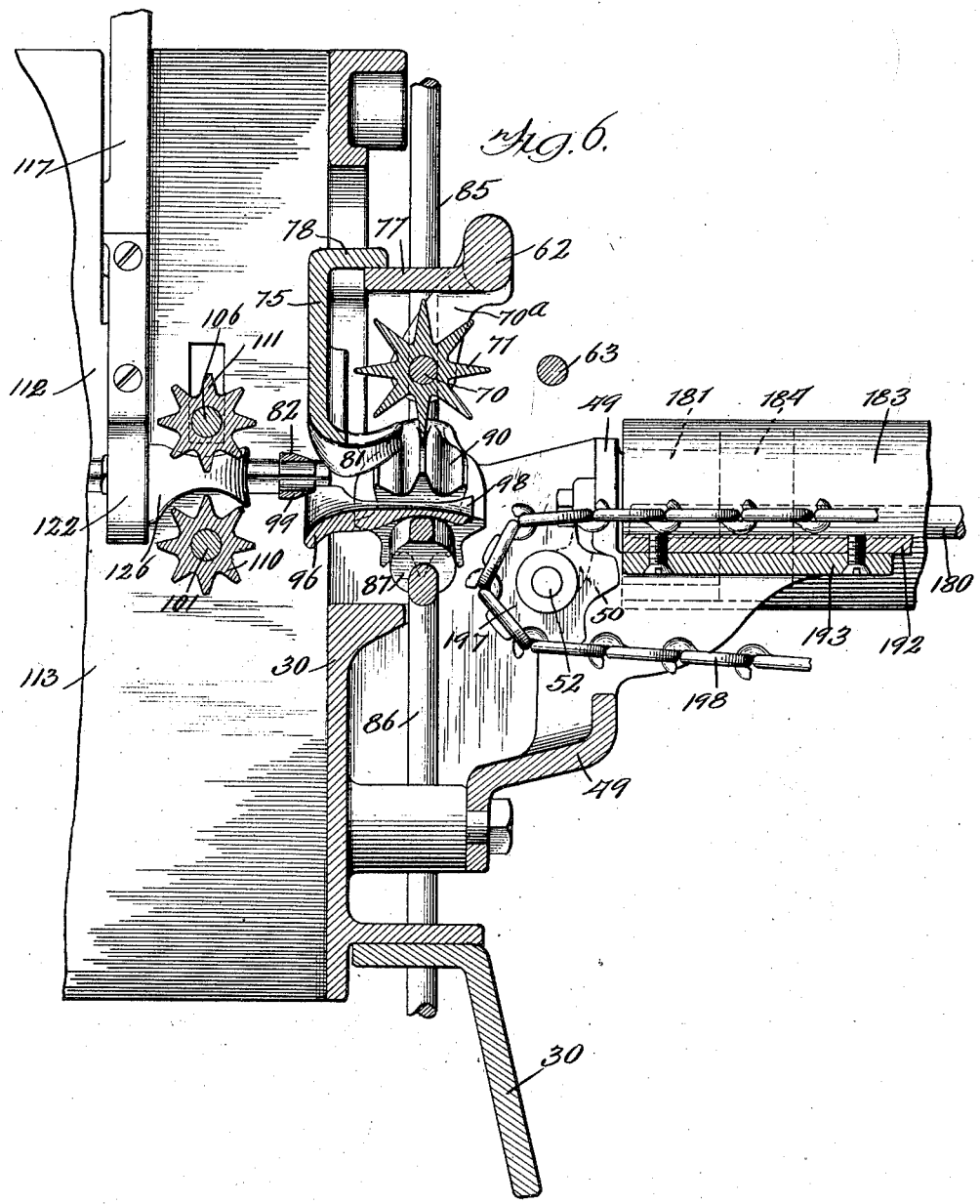

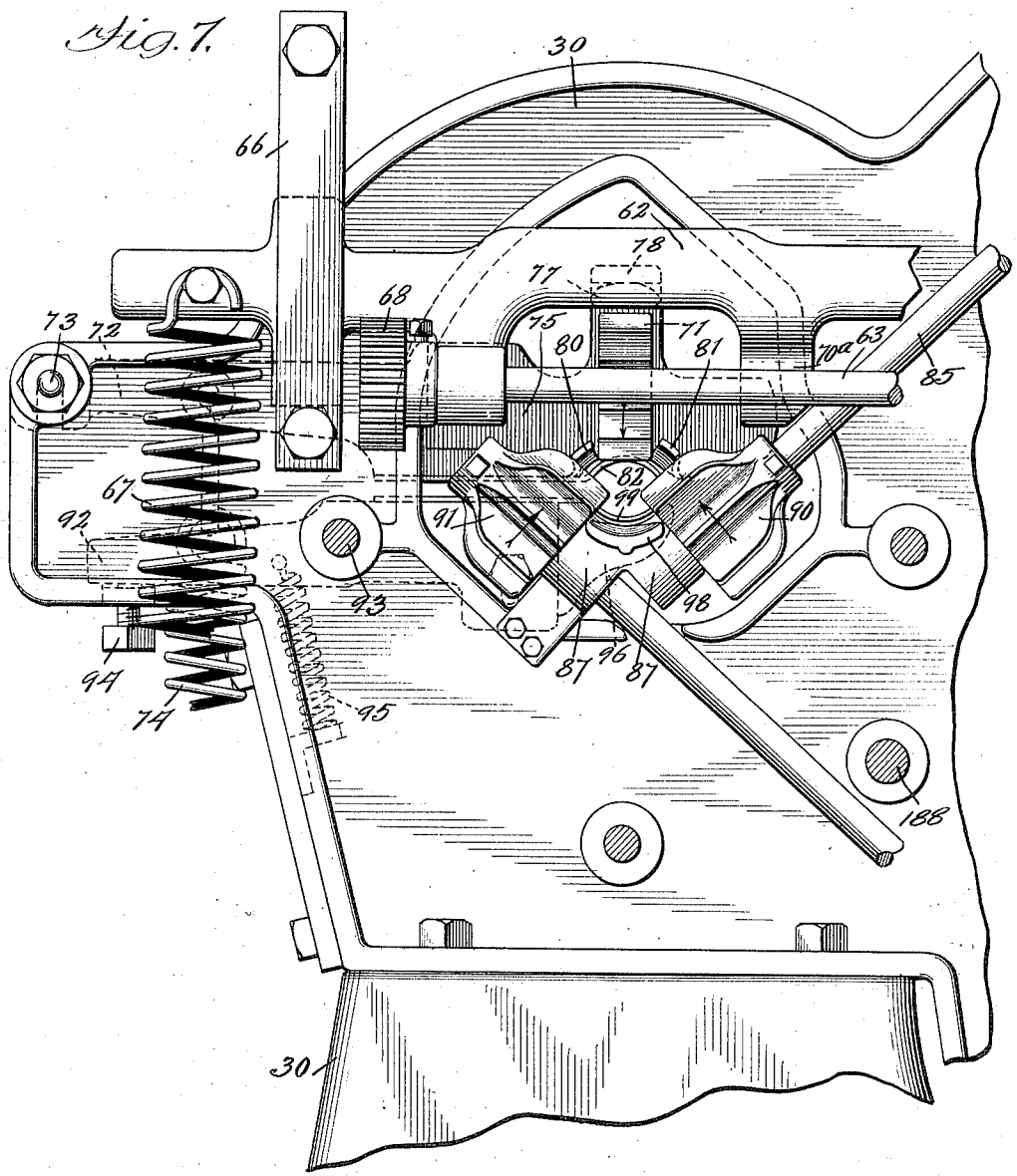

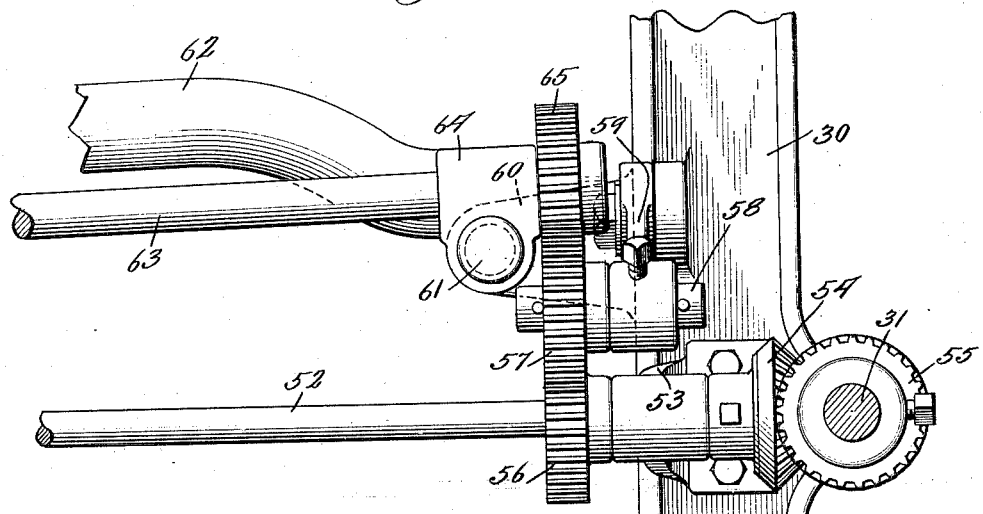
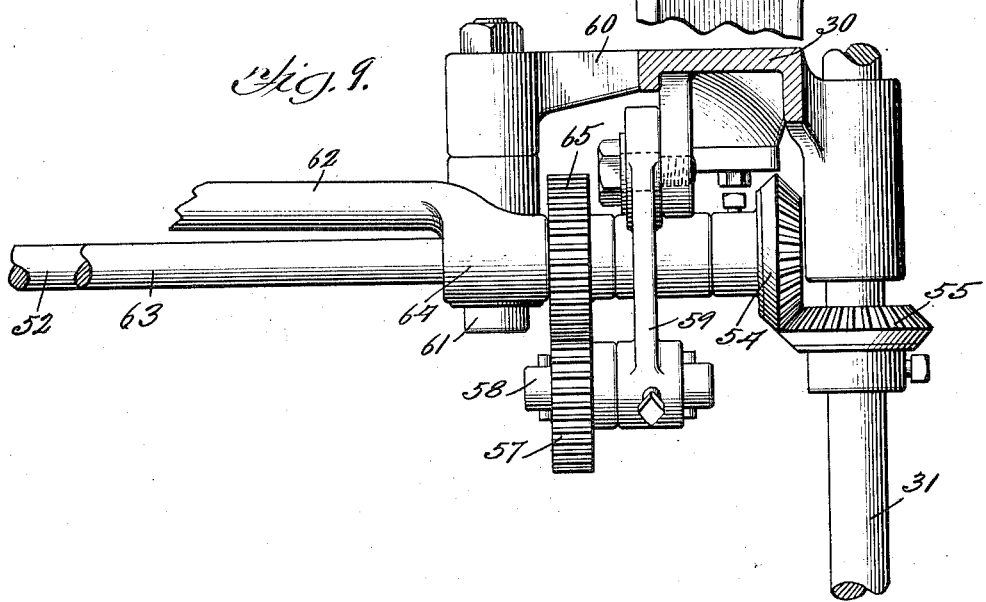

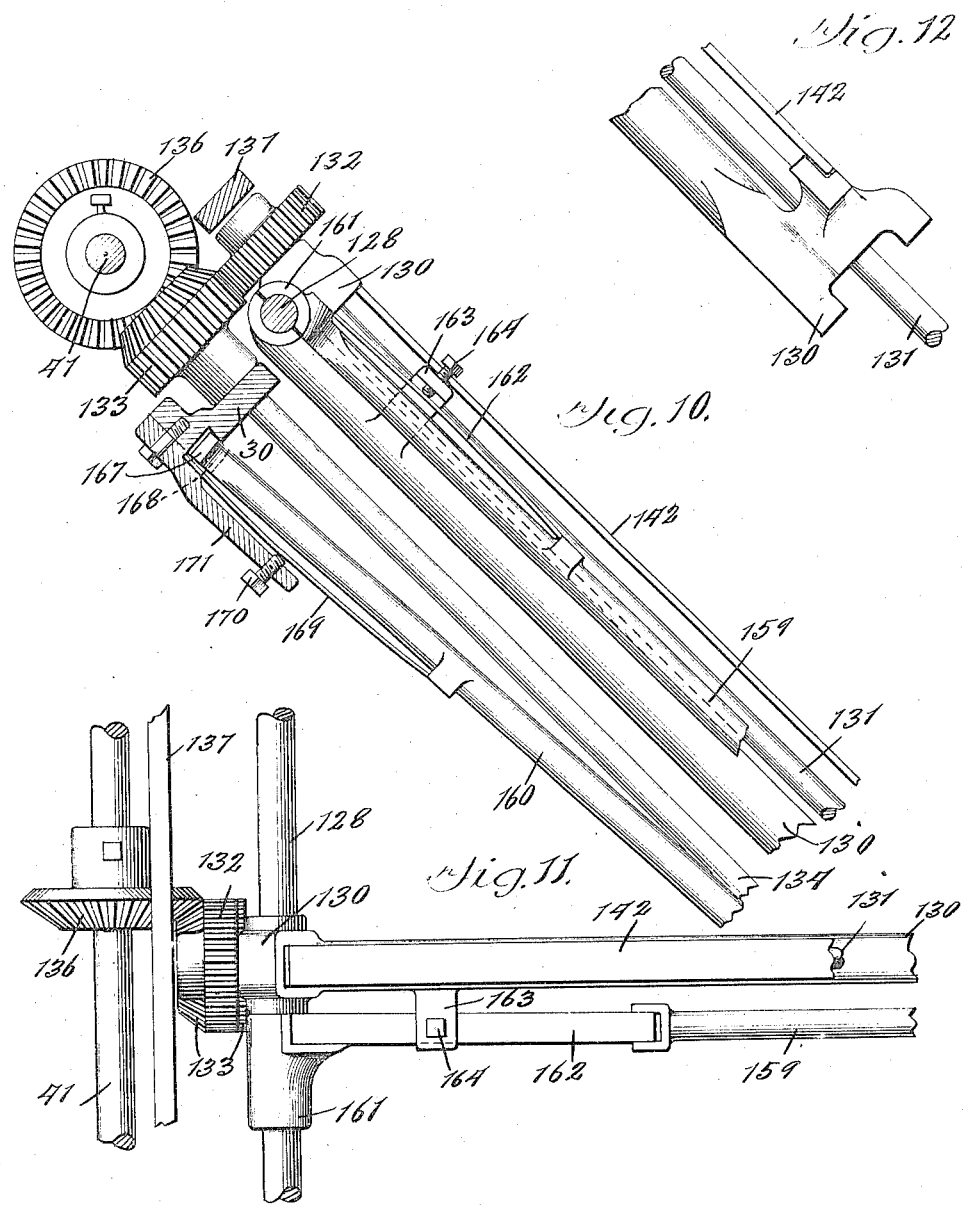

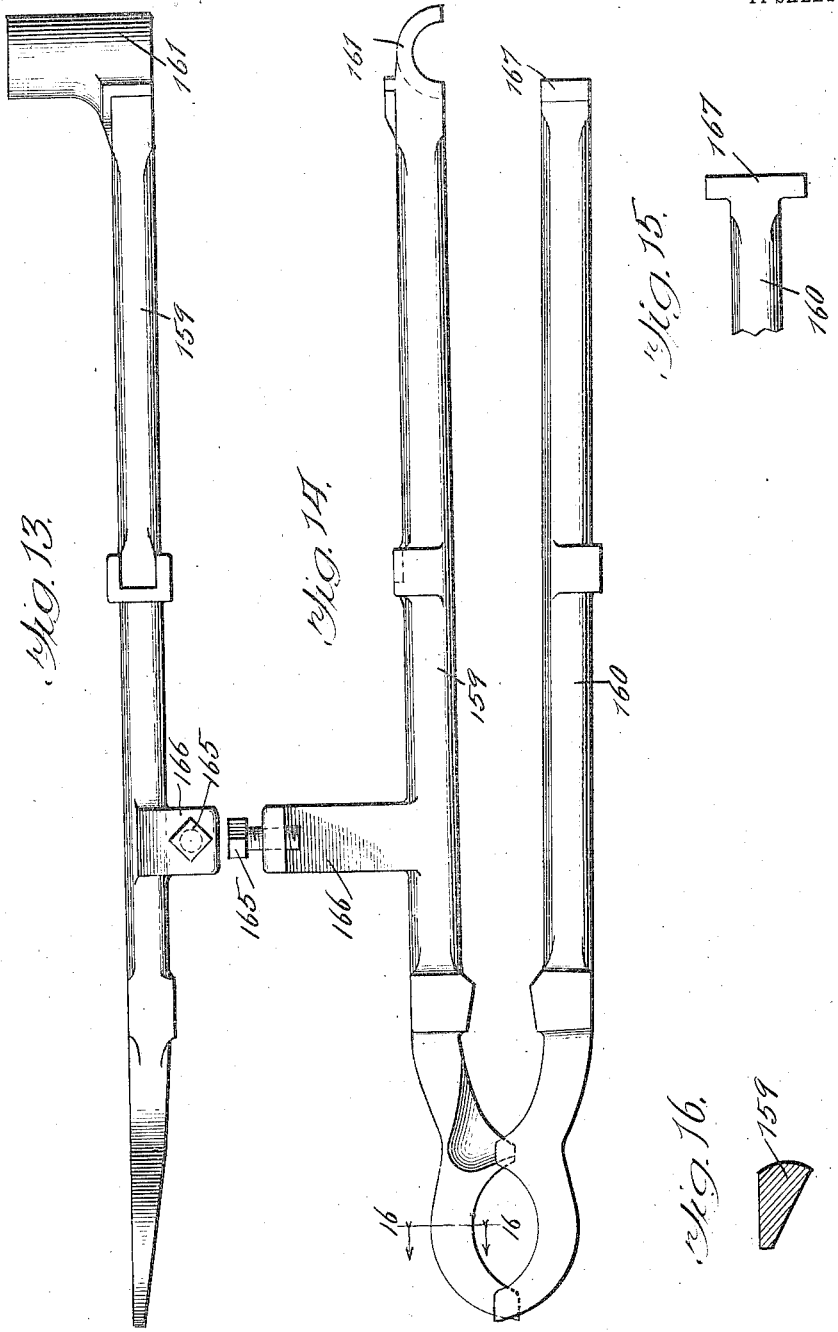

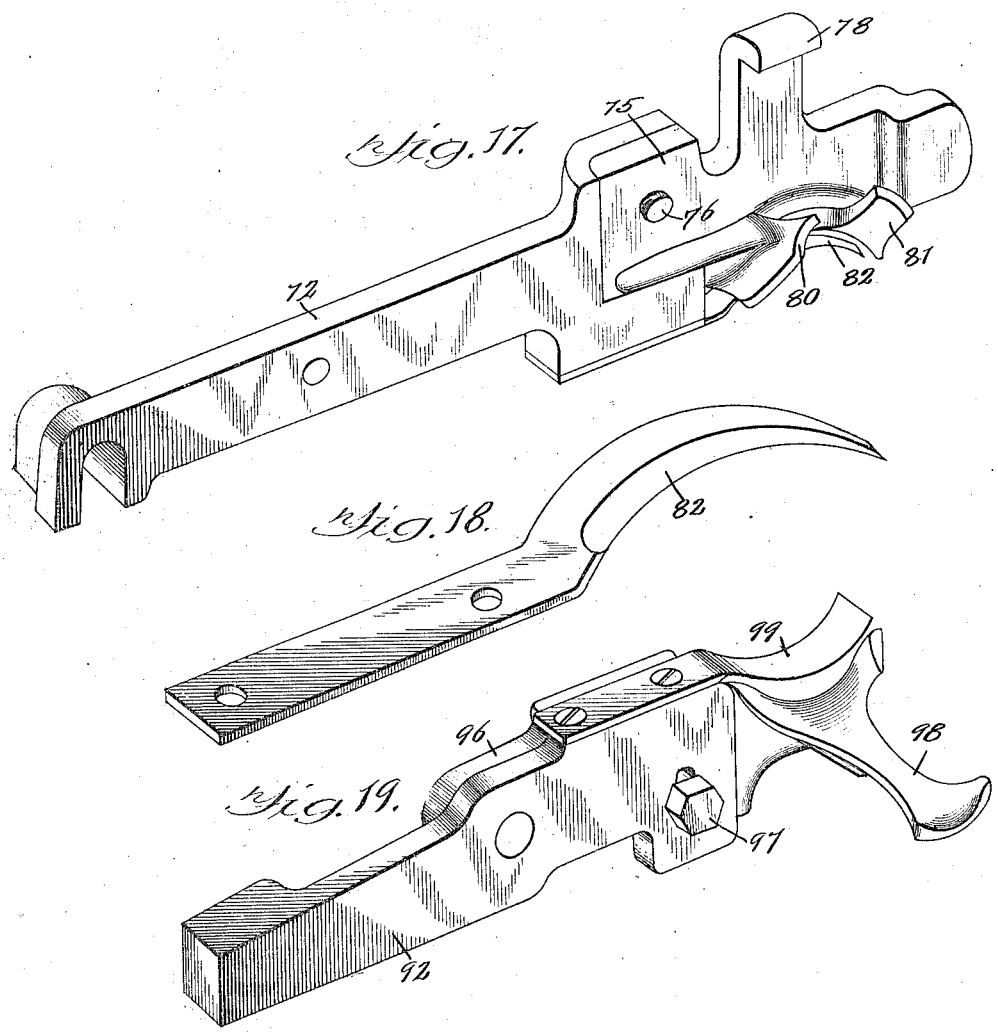

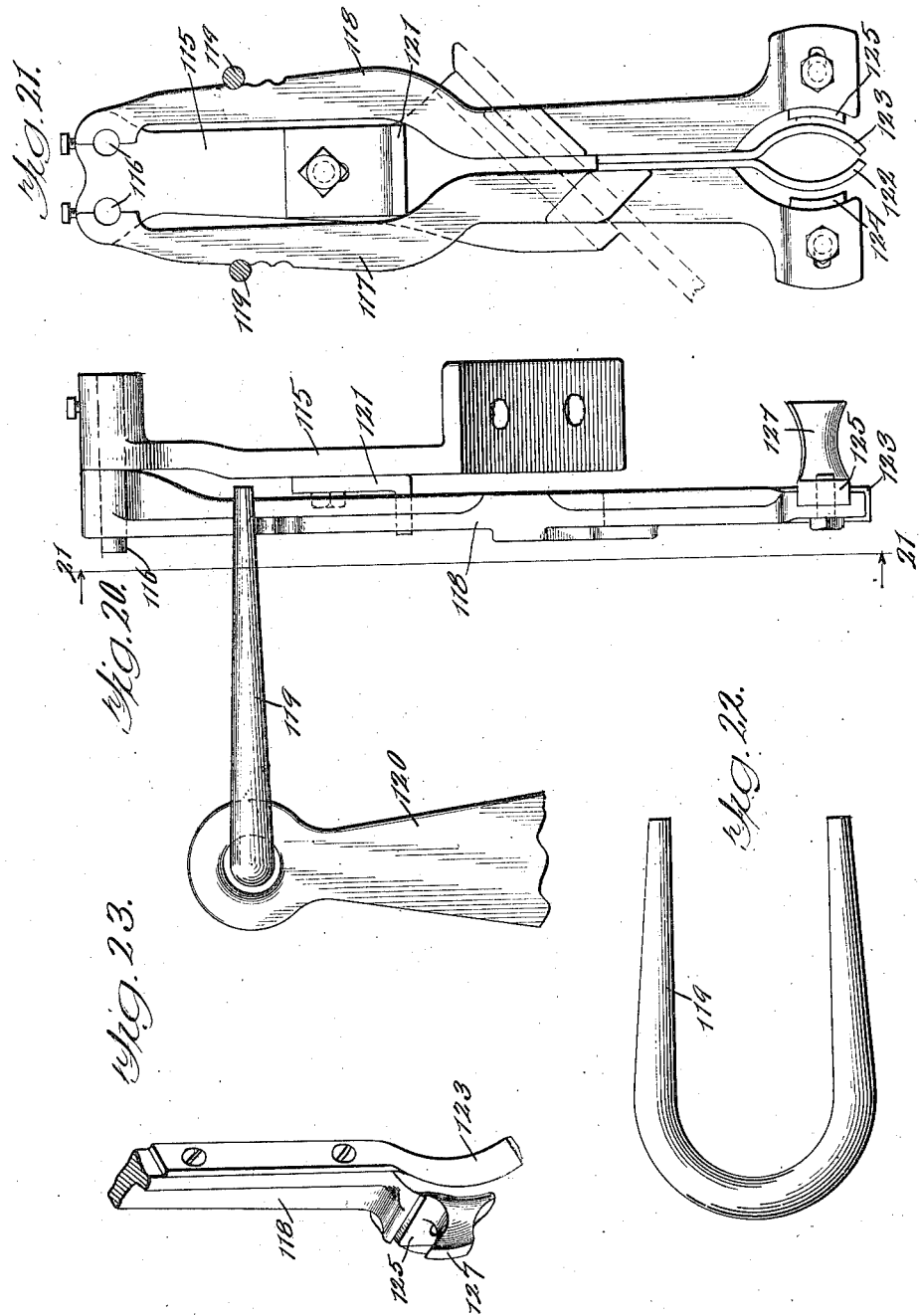

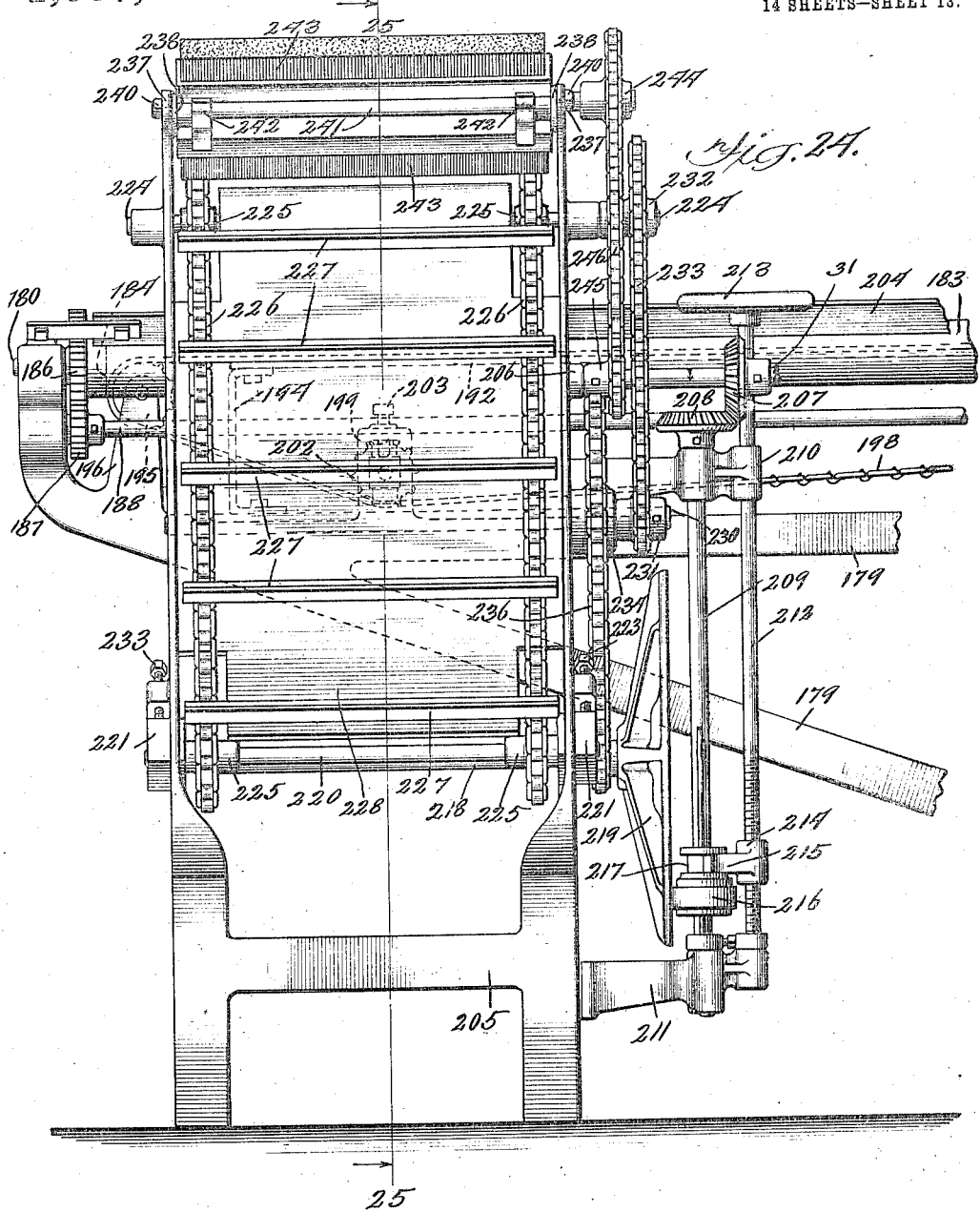

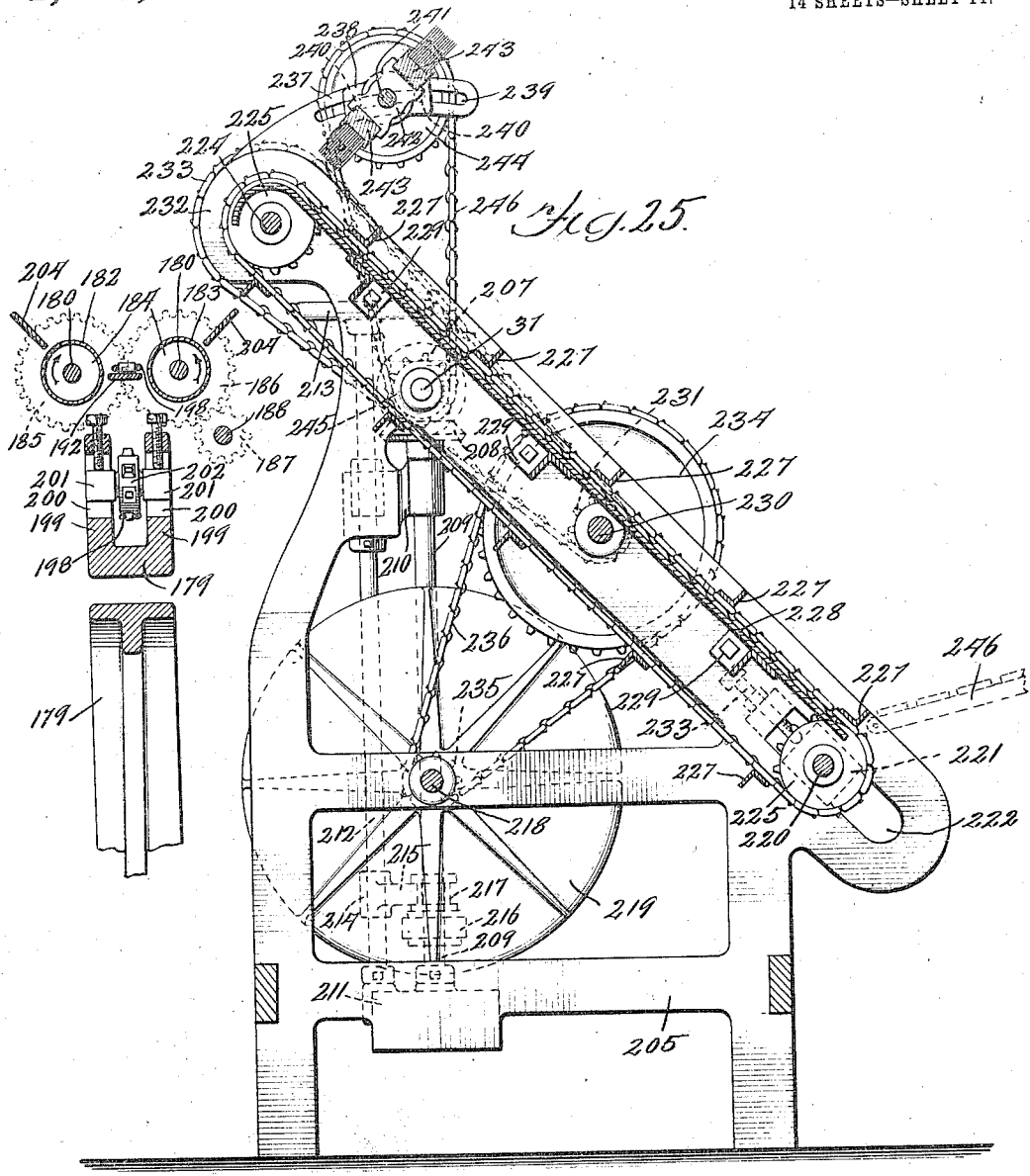

UNITED STATES PATENT OFFICE.

JOHN M. C. JONES, OF GIBSON CITY, ILLINOIS.

GREEN-CORN-CUTTING MACHINE.

1,037,014.  Specification of Letters Patent.  Patented Aug. 27, 1912.

Application filed February 27, 1911. Serial No. 611,065.

*To all whom it may concern:*

Be it known that I, JOHN M. C. JONES, a citizen of the United States, residing at Gibson City, in the county of Ford and State of Illinois, have invented certain new and useful Improvements in Green-Corn-Cutting Machines, of which the following is a specification, reference being had to the accompanying drawings.

My invention relates to machines for cutting green corn from the cob for canning purposes, and it has for its object to provide a new and improved arrangement of parts by which the corn is fed through the machine whereby the machine is more readily adaptable to different-sized ears of corn, whereby the cobs are less likely to be deflected out of their normal course, and whereby the cobs are more thoroughly scraped to secure and save the entire kernel of the corn.

Another object is to provide a new and improved means for feeding the ears to the cutting knives one after another as fast as the machine can handle them.

Another object is to improve the construction and operation of machines of this general type in sundry details hereinafter pointed out.

The means by which I have accomplished these objects are illustrated in the drawings and hereinafter specifically described.

That which I believe to be new is set forth in the claims.

Figure 2:
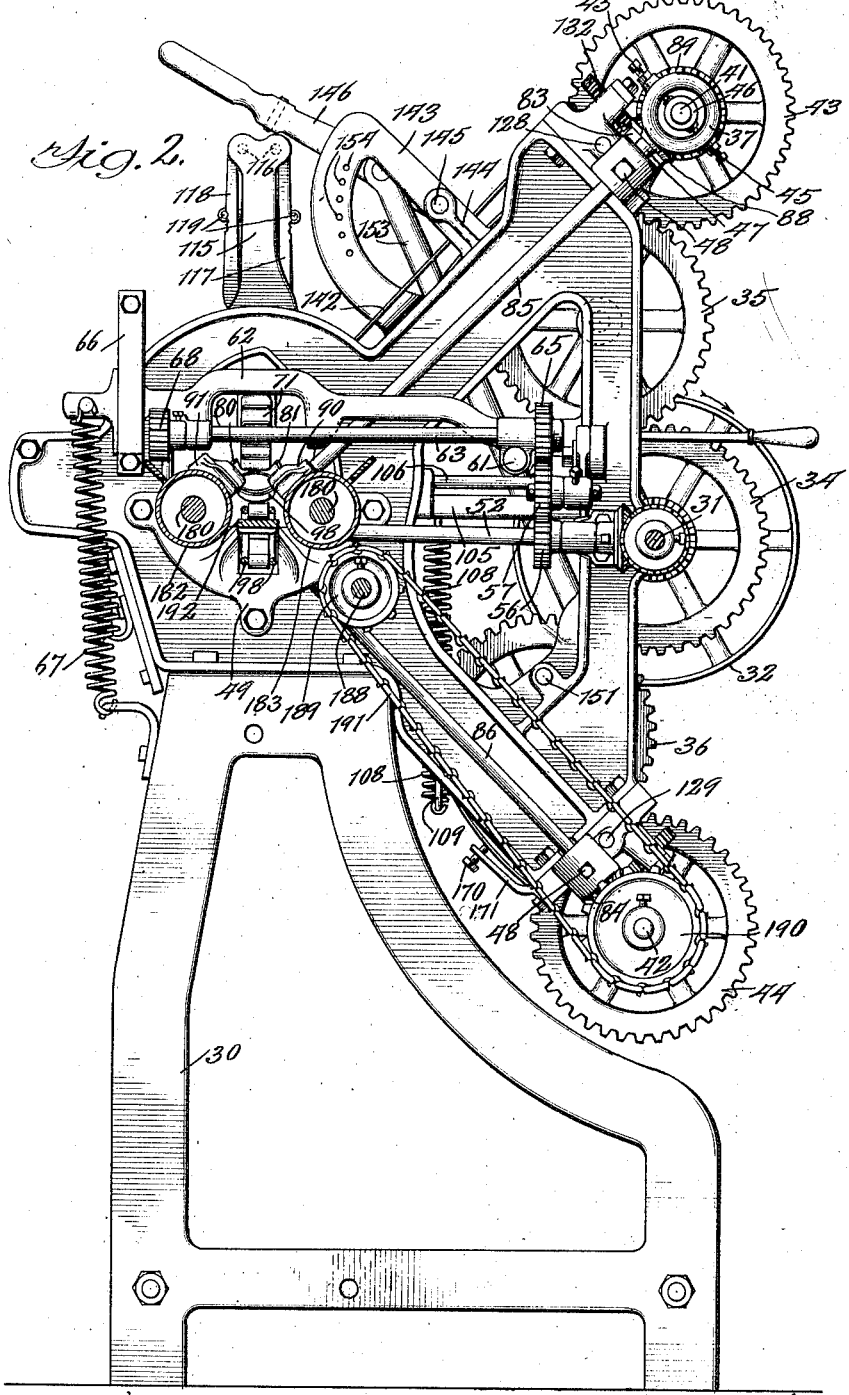
Figure 3:
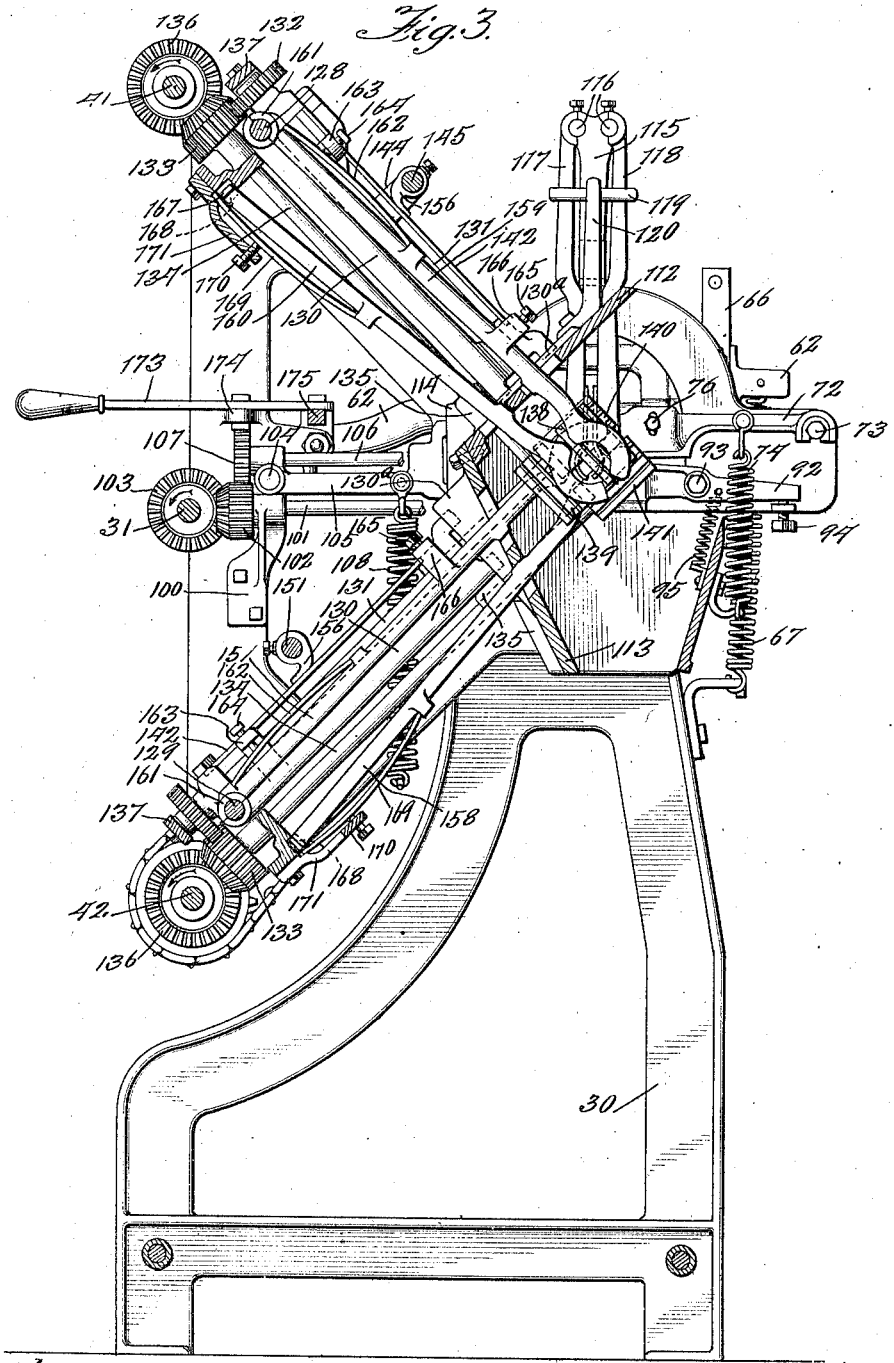
Figure 4:
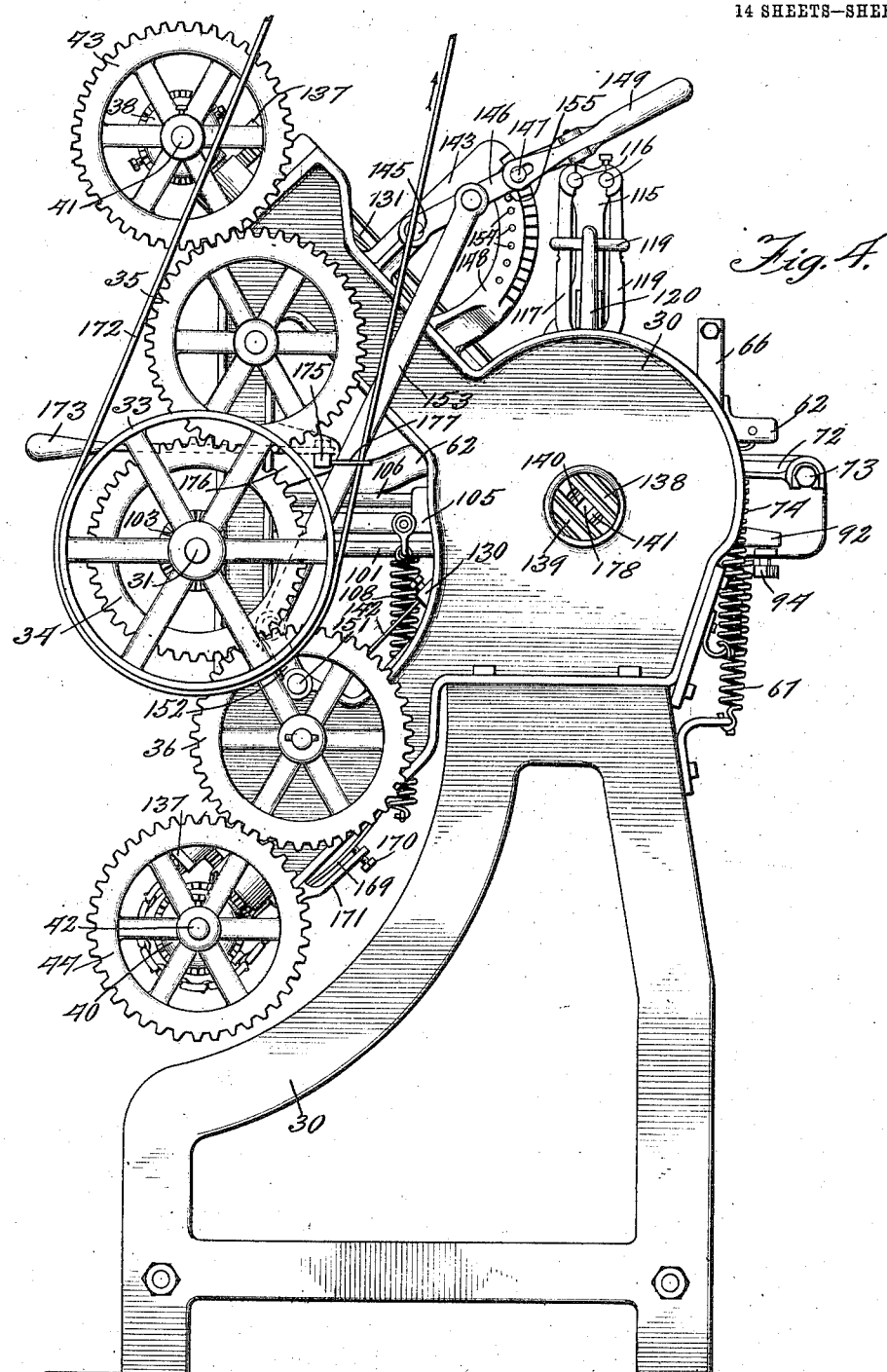
Figure 5:
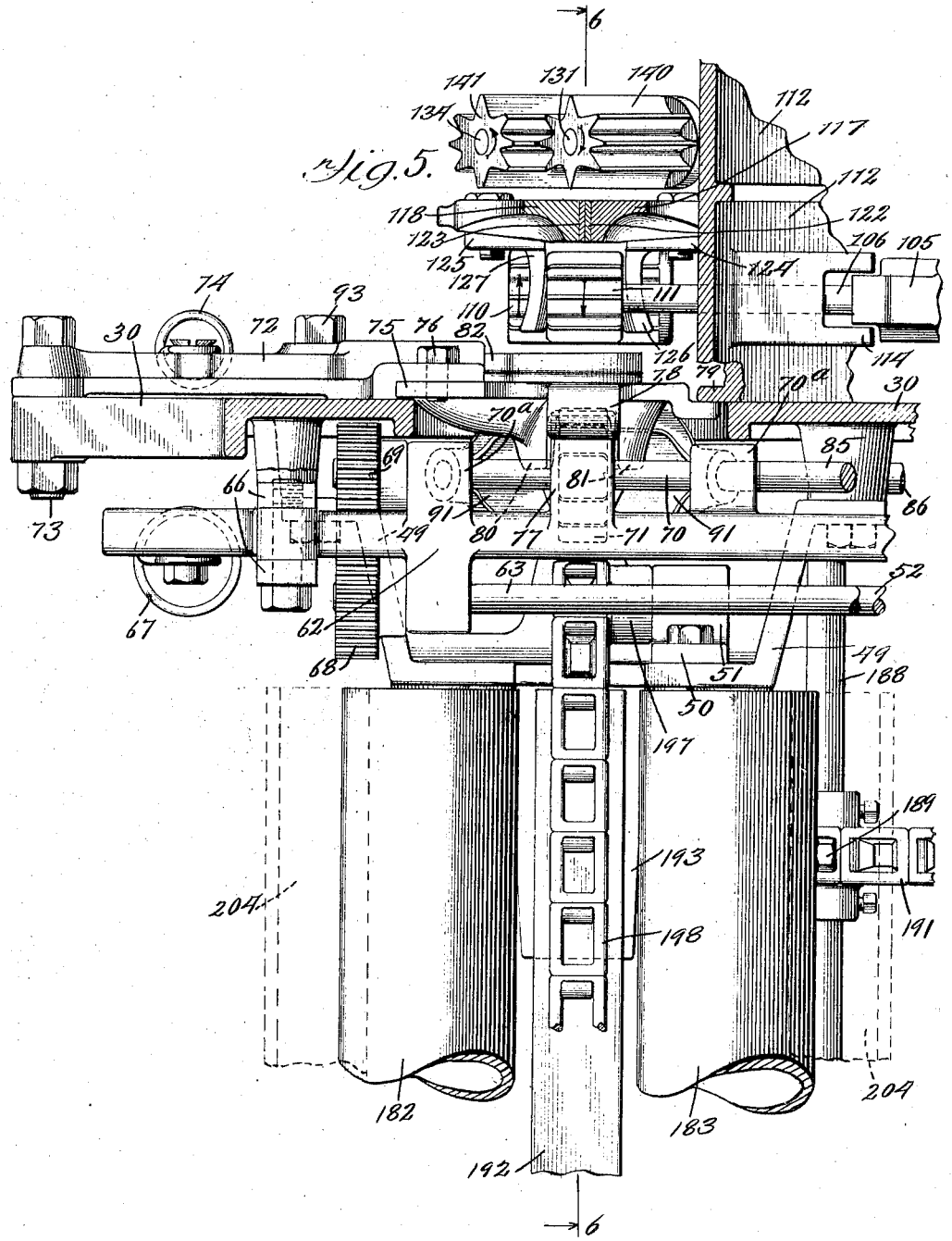

In the drawings:—Figure 1 is a front elevation of one end of the machine. Fig. 2 is an end view of the parts shown in Fig. 1 seen from the right in said figure. Fig. 3 is a section taken on line 3—3 of Fig. 1. Fig. 4 is an end view of the machine seen from the left in Fig. 1. Fig. 5 is substantially a section taken on line 5—5 of Fig. 1. Fig. 6 is substantially a section taken on line 6—6 of Fig. 5. Fig. 7 is an end view of a portion of the machine with the feeding rolls and connected parts removed, showing the parts by which the ears of corn are received from the feeding rolls. Fig. 8 is a fragmentary view showing the manner of mounting the shafts which carry the spurs which control the ears in their progress from the horizontal to the vertical cutting knives. Fig. 9 is a top view of the parts shown in Fig. 8. Fig. 10 is a fragmentary view showing the mounting of two of the diagonally-extending shafts which carry the spur rollers which forward the cobs after the principal part of the corn has been cut from them, and showing also the mounting of the scrapers which coöperate therewith. Fig. 11 is a view diagonally downward at the parts shown in Fig. 10. Fig. 12 is a fragmentary elevation of the lower end of one of the pivoted boxes in which are mounted the spur roller shafts above referred to. Fig. 13 is a view diagonally downward upon one of the upper scrapers. Fig. 14 is a side view of the scraper shown in Fig. 13, showing the coöperating lower scraper also in connection therewith. Fig. 15 is a top or plan view of the end of the lower scraper as shown in Fig. 14. Fig. 16 is a section taken at line 16—16 of Fig. 14. Fig. 17 is a perspective view of the upper horizontal cutting knife and arm. Fig. 18 is a perspective view of the upper horizontal cutting knife removed from its arm. Fig. 19 is a perspective view of the lower horizontal cutting knife and arm. Fig. 20 is a side view of the two vertical cutters and the spring by which they are held in proper relation to each other. Fig. 21 is a view on line 21—21 of Fig. 20. Fig. 22 is a top view of the spring shown in Fig. 20. Fig. 23 is a perspective view of the lower end of one of the vertical cutters. Fig. 24 is a rear elevation of the part of the machine by which the corn is delivered to the cutting and scraping tools. Fig. 25 is a section taken on line 25—25 of Fig. 24, certain other parts being shown in dotted lines in their relative positions.

Referring to the several figures of the drawings, in which corresponding parts are indicated by like reference characters,—30 indicates the frame of the machine, in which is suitably journaled a drive shaft 31, provided with a pulley 32 loosely mounted thereon and a pulley 33 keyed or otherwise non-rotatably secured thereon.

34 indicates a gear non-rotatably mounted on the shaft 31, meshing with which are two gears 35—36 suitably journaled on the framework 30.

37—38—39—40 indicate bearing rings supporting shafts 41—42, keyed or otherwise non-rotatably secured upon which shafts are gears 43—44, respectively, meshing with gears 35 and 36. Each of the bearing rings 37—38—39—40 is provided with two oppositely-disposed set-screws 45 which at their inner ends engage sleeves 46 in which the shafts are journaled, the shafts thus being capable of a slight adjustment in position. The bearing rings are mounted on the frame by means of studs 47 projecting therefrom, each of said studs being adjustable longitudinally of itself in a suitable socket on the framework of the machine and being held in adjusted position by means of a set-screw 48.

Referring to Figs. 5 and 6, 49 indicates a bracket bolted or otherwise suitably secured to the framework 30. 50 indicates an arm suitably secured to the bracket 49, having a sleeve 51 at its lower end in which is journaled the front end of a shaft 52, the other end of which (see Figs. 8 and 9) is journaled in an arm 53 suitably secured to the framework 30. Said shaft is provided at its rear end with a bevel gear 54 which meshes with a bevel gear 55 mounted on the drive shaft 31. 56 indicates a gear mounted on said shaft 52, meshing with which is a gear 57 which is journaled upon a pin 58 carried by an arm 59 suitably secured to the framework. 60 indicates an arm projecting from the framework 30 supporting at its outer end a pin 61, upon which is journaled a shaft-box 62. 63 indicates a shaft journaled in a sleeve 64 on said shaft-box 62, upon the rear end of which shaft is mounted a gear 65 meshing with the gear 57. 66 indicates two bars spaced apart and secured to the frame 30, between which the box 62 is adapted to bear in its swinging upon the pin 61. 67 indicates a coiled spring secured to the forward end of said box and to the framework, tending to hold said box yieldingly against swinging. The forward end of the shaft 63 has keyed or otherwise non-rotatably secured upon it a gear 68, meshing with which is another gear 69 keyed or otherwise non-rotatably mounted upon a short shaft 70 journaled in arms 70$^a$ on the box 62 parallel with the shaft 63. Keyed or otherwise non-rotatably secured upon the shaft 70 is a spur wheel 71 located directly opposite and a very short distance higher than the end of the feeding chain hereinafter described.

72 indicates the upper one of the two horizontal knife arms (see Figs. 5, 7 and 17), pivoted at its forward end upon a pin 73 carried by the frame 30 and adapted to be lifted readily from said pin. 74 indicates a coiled spring tending to hold said knife arm against rising at its rear end.

75 indicates a plate secured to the arm 72 by means of a bolt 76, the opening through the arm 72 being in the form of a slot, as shown in Fig. 3, thus permitting a slight adjustment of the parts 72 and 75.

77 indicates a lug (see Figs. 6 and 7) projecting from the box 62, upon which rests a horizontal lug 78 carried by the plate 75, thus serving to support the knife arm from the shaft-box and causing the knife arm to rise with the box 62 and star wheel 71.

As shown in Fig. 5, the rear end of the plate 75 bears against a lug 79 on one of the cross-plates hereinafter described, serving to guide the knife arm and to prevent it from being forced out of normal position.

80—81 indicate tongues extending diagonally outward from one face of the plate 75.

82 indicates the knife blade secured to the arm 72 and extending quite close to the bases of the tongues 80—81, as best shown in Fig. 6.

83—84 indicate sleeves carried by the frame 30 in which are journaled the rear ends of the shafts 85—86, respectively, (see Figs. 1 and 2), the forward ends of which are journaled in sleeves carried by the bracket 87 suitably secured to the framework 30.

88 indicates a bevel gear keyed or otherwise non-rotatably mounted upon the rear end of each of the shafts 85—86, meshing with a gear 89 keyed or otherwise non-rotatably mounted upon the shafts 41—42, respectively.

90—91 indicate spur wheels mounted on the shafts 85—86, respectively, below and at either side of the spur wheel 71.

92 indicates the lower one of the two horizontal knife-arms (see Figs. 3, 7 and 19), pivoted upon the bolt 93 by which the bracket 49 is secured to the framework 30.

94 indicates a set-screw adjustable up and down in the frame 30 below the arm 92 and adapted to regulate the extent to which the rear end of the knife-arm may be raised. 95 indicates a coiled spring holding the forward end of said arm 92 yieldingly in contact with the set-screw 94.

96 indicates a plate adjustably secured to the rear end of the arm 92 by means of a bolt 97.

98 indicates a tongue projecting substantially horizontally from one side of the plate 96 to a point below the spur wheel 71 and between the spur wheels 90—91.

99 indicates the knife blade secured to the rear end of the knife-arm 92.

100 indicates a bracket secured to the framework (see Fig. 3), in a sleeve in the upper end of which is journaled a shaft 101, upon the rear end of which is mounted a combination spur and bevel gear 102, meshing with a bevel gear 103 mounted on the drive shaft 31.

104 indicates a spindle secured in any appropriate manner to the framework 30, upon which is pivotally mounted a shaft-box 105, in which a shaft 106 is suitably journaled directly above the shaft 101.

107 indicates a spur gear keyed or otherwise non-rotatably mounted on the shaft 106 and meshing with the gear 102 on the shaft 101.

108 indicates a coiled spring connected at its upper end to the pivoted box 105 and at its lower end to a bracket 109 carried by the frame 30, said spring tending to hold said box yieldingly against swinging upward.

110—111 indicate spur wheels mounted, respectively, on the forward ends of the shafts 101—106.

112—113 (see Fig. 3) indicate two cross-plates extending from one of the standards of the frame 30 to the other, through suitable openings in which plates the shafts 101—106 project. 114 indicates a guide carried by said plates 112—113 (see Figs. 3 and 5), between opposing parts of which the box 105 is movable.

As best shown in Figs. 5 and 6, the spurs 110—111 are directly in line with the knife blades 82—99 and coöperating parts and positioned a very short distance from them.

115 indicates a standard (see Figs. 1, 20 and 21) suitably secured to the plate 112 near an opening therethrough.

116 indicates two pins projecting from one face of the standard 115 at opposite sides thereof.

117—118 indicate the arms of the two vertical knives, each of which at its upper end is hollowed out in semi-cylindrical form to fit one of the pins 116 upon which it is mounted, a U-shaped spring 119 being provided for maintaining the arms 117—118 in position on said pins and for holding the lower ends of the arms yieldingly together. The spring 119 is pivotally supported in proper position by a bracket 120 suitably secured to the plate 112. The arms are kept centered relative to the standard 115 by means of a centering block 121 carried by the standard. As shown in Fig. 21, the arms are curved toward each other at about their central parts. The centering block 121 is mounted opposite these curved portions and is adjustable up and down whereby said block 121 is capable of being adjusted to hold said arms at a variable distance from each other.

122—123 indicate the vertical knife blades carried by the arms 117—118, respectively.

124—125 indicate plates adjustably mounted on the lower ends of the arms 117—118, respectively, from the faces of which project tongues 126—127, respectively. As shown in Figs. 5 and 6, the tongues 126—127 project one on each side of the spur wheel 111 and substantially midway between the spur wheels 110 and 111.

128—129 indicate cross-rods extending from one of the standards of the frame to the other. 130 indicates shaft-boxes (see Figs. 1, 3 and 10) pivotally mounted on said rods and adapted to swing about the same, bearing at their forward ends against ribs 130ª on the cross-plates 112—113. 131 indicates shafts journaled in said boxes 130, upon the rear ends of which shafts are mounted gears 132, meshing with combination spur and bevel gears 133 mounted on the rear ends of shafts 134 directly under the shafts 131, said shafts 134 being suitably journaled in the framework 30 at their rear ends and at their forward ends being journaled in studs 135 carried by the plates 112—113.

136 indicates bevel gears mounted on the shafts 41 and 42 meshing with the gears 133.

137 indicates cross-bars suitably secured at each end to the framework 30 and extending along the rear ends of the shafts 131.

138—139 indicate spur rollers keyed or otherwise non-rotatably mounted on the forward ends respectively of the shafts 131—134 that are driven from the shaft 41, and 140—141 indicate spur rollers keyed or otherwise non-rotatably mounted on the forward ends respectively of the shafts 131—134 that are driven from the shaft 42. As shown in Fig. 4, the spur rollers 138—139 are positioned opposite and substantially at right angles to the spur rollers 140—141, and from Figs. 1 and 3 it can be seen that they are located directly in line with the spurs 106—110 and the knife blades hereinbefore referred to.

142 indicates flat springs bearing at their ends upon the shaft boxes 130.

143 indicates a bracket rising from the framework 30, journaled in which and in a bracket 144 is a rock-shaft 145 extending across from one to the other of the standards of the frame 30. 146 indicates a lever keyed or otherwise non-rotatably mounted on the rock-shaft 145. 147 indicates a pin slidably mounted in said lever 146, adapted to engage at one end a circular rack 148 carried by said bracket 143. 149 indicates a releasing latch pivotally mounted on said lever, the lower end of which latch engages the pin 147 so that by the movement of the upper end of the latch toward the lever the pin 147 is released from the rack 148. 150 indicates a spring tending to hold said latch away from said lever. 151 indicates a rock-shaft suitably journaled in the framework 30 and extending from one to the other of the standards of said framework. 152 indicates a short arm keyed or otherwise non-rotatably mounted on said rock-shaft 151. 153 indicates a link pivotally connected at its upper end with said lever 146 and pivotally connected at its lower end with the upper end of said arm 152. It will thus be seen that by the movement of the lever 146 the rock-shafts 145 and 151 are simultaneously rocked.

154 indicates a series of holes in the rackbar 148, in any one of which a pin 155 is adapted to be inserted for limiting the movement of the lever 146, as will be readily understood.

156 indicates cams (see Fig. 3) mounted on the rock-shafts 145 and 151, one of which cams is adapted to bear on each of the springs 142. The shape of the cams and the position of the rock-shafts 145 and 151 relative to the springs 142 are such that, when the rock-shafts are in position with the lever 146 swung into its uppermost position, the springs 142 are not compressed, but that the compression of the springs 142 by the cams 156 increases as the lever 146 is swung downward.

Adjacent to each pair of spur rollers 140—141 are mounted a pair of scrapers 157—158, and adjacent to each pair of spur rollers 138—139,—except the pair farthest to the left in Fig. 1,—are mounted a similar pair of scrapers 159—160 (see Figs. 3 and 14). Each of the scrapers 157—159 is provided at its rear end with a semi-cylindrical hub 161 which rests upon and fits snugly one of the cross-rods 128 or 129. 162 indicates springs the ends of each of which are supported in suitable bearings on the upper surface of the scrapers 157—159. 163 indicates arms rising from the shaft-boxes 130, through the upper end of which extend set-screws 164 bearing at their ends on the springs 162. By this construction, the scrapers 157—159 are in effect pivoted on the rods 129—128, respectively, the hubs 161 being held normally in contact with the rods by the springs 162 which also hold the scrapers yieldingly against rising relative to the shaft-boxes 130. The scrapers 157—159 are caused to rise positively with said shaft-boxes by means of set-screws 165 carried in the upper ends of arms 166 rising from said scrapers and bearing at their lower ends on said shaft-boxes, as best shown in Fig. 3.

Each of the scrapers 158—160 is provided at its rear end with a T-shaped head 167 (see Fig. 15). Each of the heads 167 is set into a pocket in the framework 30, lugs 168 (see Fig. 1) projecting from either side to assist in holding the scrapers 158—160 in place.

169 indicates flat springs bearing at their ends on the scrapers 158—160. 170 indicates set-screws carried by plates 171 and adapted to contact said springs 169 to compress the same whereby said scrapers 158—160 are held yieldingly in their uppermost position in contact with the upper walls of the openings in the plates 113—112 through which said scrapers extend. As shown in Fig. 3, the forward ends of the scrapers are positioned substantially in line with each other and substantially in line with the spur rollers and knife blades hereinabove described.

172 indicates a driving belt (see Fig. 4) adapted to run on the pulleys 32—33 and driven from any suitable source of power. 173 indicates a lever pivotally mounted on a lug 174 carried by the framework 30. 175 indicates a bar pivotally connected at one end to the forward end of said lever 173, and supported at its other end by a lug 176 carried by the frame-work. 177 indicates pins carried by said bar 175 on either side of said belt 172. It will readily be understood that by the manipulation of the lever 173 the belt 172 may be shifted at will from one to the other of the pulleys 32—33.

With the driving belt 172 running upon the pulley 33 in the direction indicated by the arrow next to the pulley in Fig. 2, the spur wheels 71, 90 and 91 will be rotating very rapidly in the directions indicated by the arrows on those spur wheels, the machine being designed to have the shaft 31 running at about three hundred revolutions per minute. The set-screw 94 being regulated to suit the average size of the ears of corn to be treated, one end of an ear of green corn is presented to the spur wheels and is drawn quickly between them, the flaring tongues 80, 81 and 98 causing the ear to be directed positively in the normal direction. The spur wheel 71 is free to give upward the requisite amount against the action of the spring 67, owing to its being mounted in the pivoted shaft-box 62, the blade 82 being lifted by an equal amount owing to the engagement of the lugs 77—78. As the ear is forced to the left in Fig. 6, the blades 82 and 99 strip from the cob the greater part of the corn, the curvature of the blades assisting in keeping the cob in proper alinement, the blade 82 being free to give still further upward relative to the spur 71 and against the action of the spring 74, if necessary.

As the leading end of the cob leaves the blades 82—99, it comes into contact with the spur wheels 110—111, which are being rotated in the directions indicated by the arrows in Fig. 5, the wheel 111 being free to rise against the action of the spring 108, and the tongues 126—127 serving to keep the cob in proper alinement. As the leading end of the cob leaves the spur wheels 110—111, it immediately engages the blades 122 and 123 which strip from the cob practically all the remaining corn, the blades 122—123 being free to give sidewise against the force of the spring 119 but being kept substantially centered by the block 121. The cob is then caught by the first pair of spur rollers 140—141, which are rotating in the direction indicated thereon in Fig. 5, the lower roller being held stationary but the upper roller being free to give upward, as will be readily understood, against the action of the spring 142. As the roller 140 is forced upward, the scraper 157 is lifted with it by reason of the set-screw 165 bearing on the upper surface of the box 130, the set-screw 165 being regulated to suit the average size of the cobs of the corn being handled. The scraper 157 is free to move still farther upward relative to the roller 140 against the action of the spring 162, if necessary, and the scraper 158 is free to move downward relative to the roller 141 against the action of the spring 169, if necessary, the cob being forced between the scrapers by the spur rollers engaging it. The scrapers are beveled (see Fig. 16) at their operative portions in order to make it possible to force the cob between them although they are held normally by spring pressure too close together to permit of the passage of the cob. As the leading end of the cob leaves the scrapers 157—158, it is caught by the next succeeding pair of spur rollers 138—139 set at substantially right angles to the positions of the spur rollers and scrapers between which it has just passed. Each succeeding pair of spur rollers and scrapers act precisely as do the first set. By reason of the rollers being set at an angle to each other, each pair of rollers corrects any slight departure from exact central alinement which the cob may have been permitted to assume by the preceding pair. Furthermore, by reason of having the roller shafts set at an angle and driven from two independent shafts instead of by a single shaft, I am enabled to place the rollers very much closer together in the line of progress of the cob. The result is that the cob is controlled much more positively in its progress, and a much shorter cob can be run through the machine without danger of its being deflected from the proper path than has ever heretofore been successfully sent through a machine of this class. Moreover, there is another feature of the construction of my machine which assists to this same end,—namely, the fixing of the lower spur rollers in permanent fixed position, the upper spur roller only being free to give to suit the size of the cob. This has a distinct tendency to keep the path of the cob through the machine in an exact straight line and prevents the cob being forced through in a zigzag fashion.

As the corn and juice are cut and scraped from the cob, they drop down into any suitable receptacle (not shown), or any suitable means may be provided for carrying the corn away from the machine. The cobs, after being scraped by the successive pairs of scrapers, are delivered through the opening 178 and out of the machine.

In case a cob should be deflected from the normal path through the machine and become jammed between the spur rollers or the scrapers, a movement of the lever 146 to its uppermost position loosens the springs 142, making it comparatively easy to remove the cob from between the parts. After the springs 142 have been properly regulated by the movement of the lever 146,—and before such lever has been moved upward to loosen the springs as just described,—the pin 155 is designed to be placed in the opening 154 corresponding to the position of the lever, so that when it is desired again to tighten the springs 142 it is only necessary to pull the lever down into contact with the pin 155 when the springs will be again tightened to the same tension as that before the lever was moved upward to loosen the springs.

179 indicates a large heavy bracket extending from the framework 30. 180 indicates two shafts journaled at one end in bosses 181 formed with the bracket 49 and journaled at their other ends in suitable bearings in the outer end of the bracket 179. 182—183 indicate rolls each provided with a head 184 at each end keyed or otherwise non-rotatably mounted on one of the shafts 180. 185—186 indicate gear wheels mounted on the shafts 180 and meshing with each other. 187 indicates a gear meshing with the gear 186 and mounted on a shaft 188 whose outer end is journaled in the bracket 179, its other end being journaled in a suitable bearing on the framework 30. 189—190 indicate sprocket-wheels (see Fig. 1) mounted on the shafts 188 and 42, respectively, and 191 indicates a sprocket chain operatively connecting the same. By this means, the rolls 182—183 are adapted to be rotated in the directions indicated by the arrows on the heads 184 in Fig. 25.

192 indicates a long plate supported at one end by a lug 193 projecting from the bracket 49, and supported at its other end by a bracket 194 rising from the part 179.

195 indicates a sprocket wheel rotatably mounted in a pair of arms 196 rising from the bracket 179.

197 indicates a sprocket-wheel mounted on the front end of the shaft 52 in alinement with the sprocket-wheel 195.

198 indicates a sprocket-chain joining the sprocket-wheels 195 and 197, its upper portion running along and being supported by the plate 192.

199 indicates slotted standards rising from the bracket 179, in the slots 200 of which blocks 201 are free to slide up and down. 202 indicates a sprocket-wheel rotatably mounted between said two blocks 201, and 203 indicates set-screws carried by said standards and bearing against said blocks 201. By this means, the chain 198, which runs under the sprocket-wheel 202, is adapted to be tightened as required.

204 indicates rails secured in any suitable manner close to but not in contact with the rolls 182—183.

205 indicates a frame, in a suitable bearing 206 in which one end of the shaft 31 is journaled. 207 indicates a bevel gear keyed or otherwise non-rotatably secured on the shaft 31, meshing with which is another bevel gear 208 keyed or otherwise non-rotatably mounted on the upper end of a shaft 209 which is journaled in brackets 210—211 projecting from the frame 205. 212 indicates a rod journaled also in said brackets 210—211, provided with a hand-wheel 213 at its upper end. 214 indicates a sleeve screw-threaded upon the lower end of said rod 212. 215 indicates a yoke, in the construction shown formed with the sleeve 214. 216 indicates a friction roller feathered or otherwise mounted on the shaft 209 so as to rotate therewith but to be slidable longitudinally of said shaft. The hub of said roller 216 is provided with a circumferential groove 217 in which the yoke 215 bears. 218 indicates a shaft journaled in the framework 205, upon the outer end of which is keyed or otherwise non-rotatably secured a friction disk 219 upon the face of which the friction roller 216 bears. By this construction, as will be readily understood, rotation is communicated from the shaft 31 to the shaft 218, the speed of rotation of the shaft 218 being regulated as desired by moving the roller 216 up or down to engage the disk 219 at varying distances from the center.

220 indicates a shaft journaled in blocks 221 which are slidably mounted in any suitable manner in slots 222 in the frame 205. 223 indicates set-screws carried by said frame by which the blocks may be forced downward along said slots. 224 indicates another shaft journaled in the frame 205 opposite the shaft 220. 225 indicates sprocket-wheels mounted on said shafts 220 and 224, over which sprocket-wheels run two sprocket-chains 226. 227 indicates cross-bars connected to said chains 226 and adapted to travel therewith.

228 indicates a stationary apron, preferably of sheet metal, having its edges under the chains 226, secured in position by means of cross-bars 229 secured at their ends to the frame 205.

230 indicates a shaft journaled in the framework 205.

231—232 indicate sprocket-wheels mounted on the shafts 230—224, respectively, over which sprocket-wheels runs a sprocket-chain 233.

234—235 indicate sprocket-wheels mounted on the shafts 230—218, respectively, over which sprocket-wheels runs a sprocket-chain 236.

By means of the sprocket-wheels and sprocket-chain described, the cross-bars 227 are caused to move diagonally upward along the apron 228, the speed of such movement being regulated by the hand-wheel 213, as will be readily understood.

237 indicates two arms projecting from the frame 205 and formed in the shape of arcs about the shaft 31. 238 indicates blocks which are adapted to be secured at any point along the slots 239 in the arms 237 by means of bolts 240. 241 indicates a shaft journaled in said blocks 238. 242 indicates plates non-rotatably mounted on the shaft 241 at each side of the machine. 243 indicates brushes extending across the machine and secured to the ends of the plates 242 so that they are adapted to rotate with the shaft 241. 244—245 indicate sprocket-wheels mounted on the shafts 241—31, respectively, and 246 indicates a sprocket-chain running over said sprocket-wheels. By this means, the brushes are caused to revolve about the shaft 241 at a very high rate of speed.

With the shaft 31 rotating at a high rate of speed as hereinbefore described, a quantity of corn is to be placed upon the platform 247 at the lower end of the elevator. The cross-bars 227, being forced upward under the pile of corn, causes the ears to move up the apron 228 in front of the bars. The blocks 238 having been adjusted properly along the slots 239 to bring the sweep of the brushes 243 to a proper point to suit the average size of the ears, such brushes dislodge the corn and cause it to roll down the inclined elevator to the pile of corn at the bottom in case the ears happen to be piled up more than one tier deep on the apron 228. As soon as the corn arrives at the top of the elevator, it falls off onto the rolls 182—183 which are rotating at a high rate of speed, the top portions of the rolls moving toward each other. Those ears that strike the roll 183 pointing in the direction in which that roll extends are rapidly drawn along by the chain 198. Whenever an ear falls crosswise of the rolls 182—183, the movement of the rolls serves almost instantly to throw the ear into alinement in the direction it is to travel with the chain 198. In any event, the chain 198 draws away toward the knives and scrapers the ears delivered at one time before the next succeeding row of ears is delivered, the rate of movement of the cross-bars 227 being regulated by the hand-wheel 213 to this end. When the ears are once laid in proper position on the chain 198, they are drawn quickly to a point where they are grasped by the spur wheels 71, 90 and 91, as hereinbefore described.

If an ear of corn were laid crosswise of the rolls 182—183 with mathematical exactness, the rolls would have no tendency, theoretically, to turn the ear one way or the other, but when an ear is placed across the rolls with one end very slightly in advance of the other end the ear is almost instantly straightened into line. In view of the high speed at which I drive the rolls 182—183, it is found that an ear is invariably flipped around into alinement without regard to the manner in which it is delivered to the rolls.

So far as I am aware, I am the first one in the art to provide an automatically-operating feed for a green corn cutter, whereby a single operator is enabled to take care of a number of machines at a time. I therefore claim this generically and wish my claims to be construed accordingly. Moreover, I do not wish to be restricted to the use of the rolls 182—183 for the purpose of straightening the ears relative to the means by which they are delivered to the cutting and scraping parts, except as hereinafter specifically claimed, since any means may be used which will have a tendency, when an ear is placed crosswise, to turn one end in one direction and the other end in the other direction.

What I claim as my invention and desire to secure by Letters Patent is,—

1. In a green corn cutting machine, the combination with cutting devices, of a conveyer for feeding the ears to said cutting devices, and means for arranging the ears in longitudinal alinement on said conveyer when fed in bulk thereto.

2. In a green corn cutting machine, the combination with cutting devices, of a conveyer for feeding ears to said cutting devices, and means adapted to arrange the ears in longitudinal alinement on said conveyer when fed in bulk thereto by turning into position on said conveyer the end of any ear that may project transversely therefrom.

3. In a green corn cutting machine, the combination with cutting devices, of a conveyer for feeding the ears to said cutting devices, and means on one side of said conveyer tending to turn into position on said conveyer the end of any ear that may project transversely therefrom.

4. In a green corn cutting machine, the combination with cutting devices, of a conveyer for feeding the ears to said cutting devices, means on one side of said conveyer tending to turn into position on said conveyer the end of any ear that may project transversely therefrom, and means on the other side of said conveyer tending to turn in the opposite direction into position thereupon the other end of said ear.

5. In a green corn cutting machine, the combination with cutting devices, of a conveyer for feeding the ears to said cutting devices, a roll extending along one side of said conveyer, and means for rotating said roll so that its upper portion moves toward the conveyer.

6. In a green corn cutting machine, the combination with cutting devices, of a conveyer for feeding the ears to said cutting devices, a pair of rolls extending along said conveyer, one on either side thereof, and means for rotating said rolls so that the upper portion of each moves toward the conveyer.

7. In a green corn cutting machine, the combination with cutting devices, of a pair of rolls positioned parallel to each other a short distance apart, an endless chain the upper portion of which is supported between said rolls in alinement with said cutting devices, means for moving the upper portion of said chain toward said cutting devices, and means for rotating said rolls so that their upper portions move toward said chain.

8. In a green corn cutting machine, the combination with cutting devices, of a conveyer for feeding the ears to said cutting devices, means for arranging the ears in longitudinal alinement on said conveyer when fed in bulk thereto, and mechanical means for delivering the ears at a regular rate of speed to said conveyer.

9. In a green corn cutting machine, the combination with cutting devices, of a conveyer for feeding the ears to said cutting devices, a pair of rolls extending along said conveyer, one on either side thereof, means for rotating said roll so that the upper portion of each moves toward the conveyer, and mechanical means for delivering the ears at a regular rate to said conveyer.

10. In a green corn cutting machine, the combination with cutting devices, a conveyer for feeding the ears to said cutting devices, and means for arranging the ears in alinement on said conveyer when fed in bulk thereto, of an elevator for delivering the ears to said conveyer, and means for regulating the speed of said elevator.

11. In a green corn cutting machine, the combination with cutting devices, a conveyer for feeding the ears to said cutting devices, and means for arranging the ears in longitudinal alinement on said conveyer when fed in bulk thereto, of an elevator for delivering the ears to said conveyer, means for regulating the speed of said elevator, and means for preventing the elevator from delivering more than the normal number of ears in proportion to the speed of operation of said conveyer.

12. In a green corn cutting machine, the combination of a frame, a series of spur wheels adapted to be rotated in fixed positions in said frame, a second series of spur wheels above said first series and adapted to be moved upward relative thereto, yielding means tending to hold said upper series against moving upward, cutting and scraping devices interposed between said spur wheels in line therewith, means for moving said cutting and scraping devices upward with the spur-wheels of said second series, means for rotating one series of spur wheels in one direction, and means for rotating the other series in the opposite direction.

13. In a green corn cutting machine, the combination of a frame, a pair of spur rollers arranged parallel to each other in said frame and movable toward and away from each other, yielding means tending to hold said rollers together, a pair of scraping devices located opposite to said rollers, means for moving said scraping devices away from each other when said rollers move away from each other, yielding means tending to hold said scraping devices together, a pair of spur rollers arranged parallel to each other in said frame opposite and at an angle to said first mentioned pair of spur rollers, and means for rotating said rollers.

14. In a green corn cutting machine, the combination of a frame, four spur rollers arranged parallel to each other in pairs a short distance apart, a third pair of spur rollers arranged parallel to each other directly between said first mentioned pairs and at an angle thereto, the rollers of each pair being movable toward and away from each other, yielding means tending to hold each pair of rollers together, a pair of scraping devices located opposite each other interposed adjacent to one of said pairs of rollers, yielding means tending to hold said scraping devices together, means for moving said scraping devices away from each other when said rollers are moved apart, and means for rotating said rollers.

15. In a green corn cutting machine, the combination of a frame, four spur rollers arranged parallel to each other diagonally in said frame in pairs a short distance apart, a third pair of spur rollers arranged parallel to each other diagonally in said frame directly between said first mentioned pairs and at an angle thereto, one roller of each pair being substantially above the other and being movable toward and away therefrom, yielding means tending to hold each of said upper rollers down relative to its lower roller, two pairs of scraping devices one pair interposed between each two adjacent pairs of rollers, yielding means tending to hold the scraping devices of each pair together, means for raising the upper scraping devices of each pair when the corresponding adjacent roller is raised, and means for rotating said rollers.

16. In a green corn cutting machine, the combination of two diagonally disposed spur-wheels rotatably mounted with their ends directly opposite each other and with their adjacent edges only a short distance apart, a third spur-wheel rotatably mounted on a horizontal axis with one edge extending between the ribs of said first mentioned spur-wheels but movable vertically relative thereto, yielding means tending to prevent movement of said third spur-wheel from between said two diagonally disposed wheels, means for rotating said spur-wheels whereby they are adapted to grasp and draw between them an ear of corn, a knife movable relative to said diagonally disposed spur-wheels, means tending to hold said knife toward said diagonally disposed spur-wheel, and means whereby movement of said third spur-wheel away from said diagonally disposed spur-wheels also moves said knife away therefrom.

17. In a green corn cutting machine, the combination with a frame, two diagonally-disposed spur wheels rotatably mounted with their lower ends directly opposite each other and with their adjacent edges only a short distance apart, a shaft-box pivotally mounted on said frame, a shaft journaled therein, a spur-wheel mounted on said shaft with its lower edge a short distance above the adjacent edges of said first-mentioned spur wheels, a spring tending to hold said shaft-box against moving upward and means for rotating said spur wheels whereby they are adapted to grasp and draw between them an ear of corn, of a knife arm pivotally mounted on said frame, a lug on said knife-arm engaging said shaft-box whereby the upward movement of the shaft-box causes the knife-arm to move upward, a cutting blade mounted on said knife-arm, and a spring tending to hold said knife-arm against upward movement.

18. In a green corn cutting machine, the combination with a frame, two diagonally-disposed spur wheels rotatably mounted with their lower ends directly opposite each other and with their adjacent edges only a short distance apart, a shaft-box pivotally mounted on said frame, a shaft journaled therein, a spur wheel mounted on said shaft with its lower edge a short distance above the adjacent edges of said first-mentioned spur wheels, a spring tending to hold said shaft-box against moving upward, and means for rotating said spur wheels whereby they are adapted to grasp and draw between them an ear of corn, of a knife-arm pivotally mounted on said frame, a lug on said knife-arm engaging said shaft-box whereby the upward movement of the shaft-box causes the knife-arm to move upward, a cutting blade mounted on said knife-arm, a spring tending to hold said knife-arm against moving upward, a second knife-arm mounted on said frame, a tongue on said second knife-arm extending between the ends of said diagonally-disposed spur wheels directly below their adjacent edges, and a cutting blade mounted on said second-named knife-arm opposite to said first-mentioned blade.

19. In a green corn cutting machine, the combination with a frame, two diagonally-disposed spur wheels rotatably mounted with their lower ends directly opposite each other and with their adjacent edges only a short distance apart, a shaft-box pivotally mounted on said frame, a shaft journaled therein, a spur-wheel mounted on said shaft with its lower edge a short distance above the adjacent edges of said first-mentioned spur wheels, a spring tending to hold said shaft-box against moving upward, and means for rotating said spur wheels whereby they are adapted to grasp and draw between them an ear of corn, of a knife-arm pivotally mounted on said frame, a lug on said knife-arm engaging said shaft-box whereby the upward movement of the shaft-box causes the knife-arm to move upward, a cutting blade mounted on said knife-arm, a spring tending to hold said knife-arm against moving upward, a second knife-arm pivotally mounted on said frame, a tongue on said second knife-arm extending between the ends of said diagonally-disposed spur wheels directly below their adjacent edges, adjustable means bearing on said second knife-arm for limiting the upward movement of said tongue, a spring connected with said second-named knife-arm tending to hold said tongue in its uppermost adjusted position, and a cutting blade mounted on said second-named knife-arm opposite to said first-mentioned blade and opposite the end of said tongue.

20. In a green corn cutting machine, the combination of two vertical knife-arms pivotally mounted opposite each other, adjustable means for holding said arms a variable distance apart, a spring holding said arm yieldingly against said spacing means, a cutting blade carried by each of said arms at its lower end, a tongue projecting diagonally outward from each of said arms, and means for feeding an ear of corn between said tongues and against said blades.

21. In a green corn cutting machine, the combination with two vertical knife-arms pivotally mounted opposite each other, a block against which said arms bear, a spring tending to hold said arms yieldingly against said block, a cutting blade carried by each of said arms at its lower end, and a tongue projecting from one face of each of said arms at its lower end, of a spur roller revolubly mounted below said tongues, a second spur roller revolubly mounted above said first-mentioned spur roller and between said tongues, and means for rotating said spur rollers in opposite directions to grasp an ear of corn and draw it between them toward said blades.

22. In a green corn cutting machine, the combination with a frame, a shaft-box pivotally mounted thereon, a shaft journaled therein, a spur roller mounted on said shaft, a second spur roller rotatably mounted below said first-mentioned spur roller, means for rotating said spur rollers in opposite directions, a pair of scrapers pivotally mounted beside said shaft-box, a spring tending to hold the lower scraper in its uppermost position, a spring tending to hold the shaft-box in its lowermost position, a spring tending to hold the upper scraper against upward movement relative to said shaft-box, and means for causing said upper scraper to move upward with said upper roller.

23. In a green corn cutting machine, the combination of a spindle, a shaft-box pivotally mounted thereon, a scraper pivotally mounted thereon beside said shaft-box, a shaft journaled in said shaft-box, a spur roller mounted on the end of said shaft, means for adjustably supporting the free end of said scraper from said shaft-box, a spring tending to hold said scraper down relative to said shaft-box, and means for adjusting the tension of said spring.

JOHN M. C. JONES.

Witnesses:
CHLOE RADY,
C. W. KNAPP.